No. 846,114. PATENTED MAR. 5, 1907.
J. W. LATTIG & C. L. GOODRUM.
ELECTRICAL WINDING.
APPLICATION FILED MAR. 3, 1904. RENEWED JAN. 30, 1907.

Witnesses:
J. A. Mann
G. E. McFarlan

Inventors:
Jacob W. Lattig
Charles L. Goodrum
per Edward E. Clement
atty.

UNITED STATES PATENT OFFICE.

JACOB W. LATTIG, OF WYNCOTE, AND CHARLES LANE GOODRUM, OF PHILADELPHIA, PENNSYLVANIA.

ELECTRICAL WINDING.

No. 846,114.     Specification of Letters Patent.     Patented March 5, 1907.

Application filed March 3, 1904. Renewed January 30, 1907. Serial No. 354,911.

*To all whom it may concern:*

Be it known that we, JACOB W. LATTIG and CHARLES LANE GOODRUM, citizens of the United States, and residents of Wyncote, Montgomery county, and Philadelphia, Philadelphia county, Pennsylvania, respectively, have invented a certain new and useful Improvement in Electrical Windings, of which the following is a specification.

Our invention relates to systems and methods of operation involving the use of double-wound coils and other conductors which are closely enough associated mechanically and have a sufficient difference of potential between their several parts to make their static capacity noticeable. In such case each coil is composed of twin or parallel windings included in opposite sides of a metallic circuit, the coil being neutral for currents in the metallic circuit, but active for currents through the two conductors in parallel. Obviously in the latter case the two sides of the coil would be of the same potential at any given point in the windings and no capacity effect would be noticed. With current through the conductors of a metallic circuit, however, the two sides are not at the same potential, and therefore the coil becomes a condenser of low capacity, and in many cases the effect of this, especially where several coils are included, has been to practically short-circuit the line, talk in the metallic circuit from either end being better with the other end open than closed. In addition to this effect these coils increase the already undesirable capacity of long lines or cables, and this with lumped capacity.

The object of our invention is to reduce the capacity of double-wound coils and other pieces of apparatus wherein the conductors are closely associated and exposed to opposite potentials. We attain this object by reversing one conductor or body with relation to the other, so that instead of points between which there is a maximum drop being brought together those having the minimum drop will be so associated. We do not limit ourselves to this specific method or the apparatus for practicing it, however. Without actually reducing the capacity we can neutralize it in some cases by including other coils possessing self-inductance in proper relation.

Our invention is illustrated in the accompanying drawing, wherein—

Figure 1:
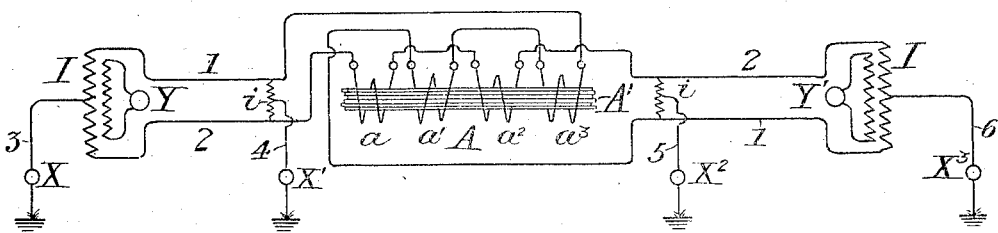
Figure 2:
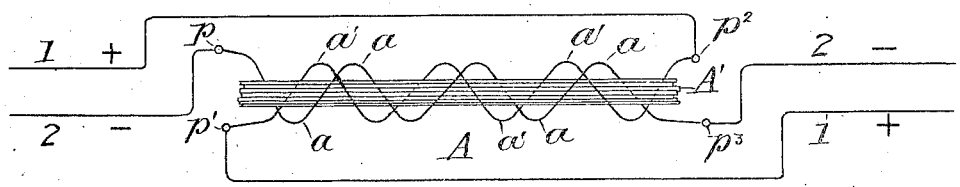
Figure 3:
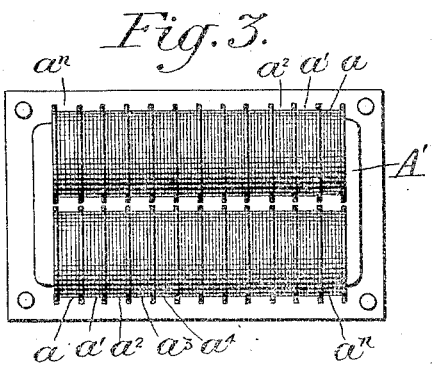
Figure 4:
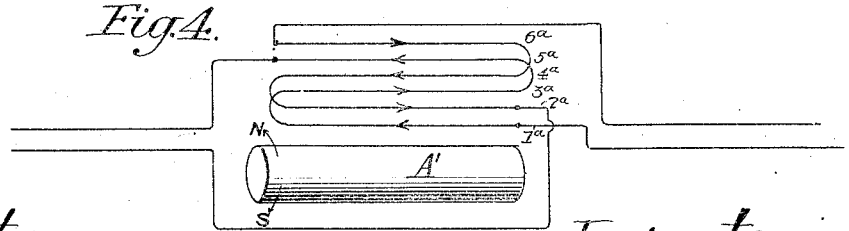

Figure 1 is a diagram showing a circuit serving six stations, four of these being grounded. Fig. 2 is a diagram showing the underlying principle involved in our method and apparatus. Fig. 3 is a plan view of a simple form of coil. Fig. 4 shows another method of winding for the long coils.

Referring to Fig. 1, Y and Y' are two telephone-stations connected by the metallic circuit 1 2, each being connected thereto through an induction or repeating coil I. The circuit 1 2 is divided into two portions for certain purposes by the insertion of the coil A; but this coil has no effect on the transmission from Y to Y', or vice versa, over the metallic circuit, as its windings are oppositely connected, so that for currents passing through them serially they neutralize each other. For currents passing over the two sides of the metallic circuit in parallel the coil becomes active, however, and presents high impedance to voice-currents or other high-frequency changing-currents. On each side of the coil A we have shown a bridged coil $i$, and from the middle points of the windings of these coils, as well as from the middle points of the windings of coils I, ground taps are taken off, in which we include the station apparatus indicated at X X' X² X³. Station X now corresponds with station X' over a circuit composed of the ground, the taps 3 and 4, and that portion of circuit 1 2 lying between coils I and coil A. Stations X² and X³ similarly make use of the circuit composed of the ground, taps 5 and 6, and that portion of the circuit 1 2 lying to the right of coil A. Three distinct circuits are here pictured, and the two grounded circuits are absolutely distinct from each other, having, moreover, nothing to do with the capacity effect of coil A, as for them conductors 1 and 2 are at the same potential always. In correspondence between stations Y and Y' it will be noted that between two points at one end of coil A there is a drop of potential, due to, first, the resistance offered by one side of coil A; second, the resistance of the extended line and instruments on the other side of the coil, and, third, the resistance of the other side of coil. Suppose we take these points at the extremities of the left-hand bridge-coil $i$. In any case the drop is obviously due to resistance out and back or double the drop between the ends of the coil A without taking account of the line. With a twin winding on the coil connected as wound we would have a maximum capacity, for the conductors would be close together throughout their length, and the difference of potential between their corresponding points would be at its greatest. We attack both these conditions, but principally the second. The charge which may be carried by such opposed surfaces as those of our conductors varies directly with the potential difference and inversely as the square of the distance between the surfaces. We first dispose the conductors so that we minimize their potential difference, and then we seek to arrange them so as to increase their distance apart without destroying their balanced average effect on the core.

Fig. 2 shows the simplest form of coil embodying our invention. Here the wire 1 is carried to the right-hand end of the coil A, then back through the winding $a'$, and forward again, as indicated by the plus-sign. Conductor 2 is led straight to winding $a$ and after passing therethrough goes on as indicated by the minus-sign. Now if two points, such as $p\ p'$, are taken, one on each conductor, it will be observed that if they be connected only one winding $a'$ will be included.
In other words, between $p$ and $p'$ there is a drop of potential due only to the coil $a'$. Similarly, if two points $p^2\ p^3$ be chosen it will be found that only coil $a$ is included between them, or, in other words, there is a drop of potential due to the resistance of that coil alone and so it will be found if any two corresponding points be selected in the associated windings. Disregarding the outside line resistance, then, we have decreased the potential differences in the coil fifty per cent., and yet, as the direction of the turns is undisturbed, the magnetic effects are unchanged. This is important.

Returning now to Fig. 1, we have in coil A not only the reversal in connections of one winding, but the windings are subdivided, so as to greatly increase their mutual distances without increasing their distances from the core or their balanced effect thereon. Here conductor 1 passes, as before, to the right-hand end of the coil and so back through one set of windings, these being carried on very thin and flat alternate spools $a$, $a^2$, &c. Conductor 2 is carried forward through similar alternating spools $a'$, $a^3$, &c. The actual mechanical construction of the coil is shown in Fig. 3, except that the individual spools are preferably even narrower than those shown. Each conductor is carried through alternate spools all the way round. Binding-posts are carried for convenience in making connections, wired so that wires lead in at one end and out at the other.

While the form of coil shown in Fig. 3 is successful, yet in many cases we have preferred to use the simpler form of coil shown in Fig. 2. In that figure only a single layer of each side of the winding is indicated. The method of winding more than a single layer, however, requires separate illustration and is therefore shown in Fig. 4. It will be observed in Fig. 2 that a connection has to be made from the point $p^2$ back to the line-wire number 1 at the end of the coil, and of course when more layers are put on this end-for-end connection would have to be made from layer to layer. To avoid this, we wind as in Fig. 4, and this we claim as a part of our invention. Suppose A' to be the core, as before, and the characters $1^a$, $2^a$, $3^a$, $4^a$, $5^a$, and $6^a$ to indicate the successive layers wound thereon, the arrows indicating the direction of current therein. Now suppose the curved arrows N and S to indicate the opposite rotary motions of the core in direct and reverse winding. Assume that all windings are started at the left hand and that winding $1^a$ is put on with the core revolving in the direction of the arrow N. Then the winding of $2^a$ would be made with the core revolving as per arrow S, winding $3^a$ would be made like $2^a$, windings $4^a$ and $5^a$ would be made in the same direction again as $1^a$, and winding $6^a$ would be made in the same direction as windings $2^a$ and $3^a$. In other words, while not twin wound, the windings are really in pairs as regards direction, the pairs being reversed symmetrically with regard to each other, which makes it possible to join coils $1^a$ and $3^a$ at one end, $3^a$ and $5^a$ at the other end, $2^a$ and $4^a$ at the first end, and $4^a$ and $6^a$ at the other end. In other words, with this method of winding connections can be made from layer to layer without using connecting-wires from end to end, and yet the potential difference between corresponding points on windings in opposite sides of the coil is kept down to a minimum as stated.

We are fully aware that many other forms of apparatus might be found to carry out our purposes and many variations might be made in the apparatus described herein, but all such variations are within the scope and purview of our invention and are contemplated by us. We believe we are the first to attain the desirable results stated in this or any manner, and our claims are to be broadly construed.

Having thus described our invention, what we claim is—
1. A coil for transmission systems having two windings and a core, said windings composed of two wires laid on the core so that their turns for equal current will produce substantially equal magnetic effects, and metallic-circuit connections for said coil comprising a pair of incoming terminals and a pair of outgoing terminals, the incoming terminals being connected to the two windings at opposite ends of the coil, and the outgoing terminals being similarly connected to the other two ends of the said windings, the arrangement being such that for currents in the metallic circuit the two windings will neutralize each other upon the core, substantially as described.

2. A coil for electric transmission systems employing differential connections, having two windings and a common core, each winding being subdivided and the subdivision of the two windings alternated on the core, together with a pair of incoming and a pair of outgoing circuit-terminals, each pair disposed at opposite ends of the windings, the arrangement being such that for circuit passing serially through the windings they will neutralize each other, substantially as described.

3. A coil for electric transmission systems employing differential connections, having two windings upon a core, each winding being subdivided and the subdivisions of the opposite windings alternated in connection, substantially as described.

4. A coil for electric systems having opposed windings laid on and connected so that current will flow through them serially in the same general direction from end to end of the core, whereby the potential difference between contiguous points is reduced to the drop around one winding, substantially as described.

5. A neutral or differential coil having a low static capacity, comprising a core, an initial layer of wire wound thereon in one direction, a second and third layer both wound in a reverse direction to the first layer, a fourth and fifth layer both wound in the same direction as the first layer, and so on, the first and third layers being joined at one end of the coil and the third and fifth at the other while the second and fourth are joined at one end of the coil and the fourth and sixth at the other, and so on, substantially as described.

In testimony whereof we have hereunto set our hands, this 19th day of February, A. D. 1904, in the presence of two subscribing witnesses.

JACOB W. LATTIG.
CHARLES LANE GOODRUM.

Witnesses:
MARY C. MCCARTHY,
E. R. CONNELLY.